Aug. 15, 1967  R. P. NEWMAN  3,335,512
ILLUMINATED SIGN
Filed Aug. 30, 1965  5 Sheets-Sheet 2
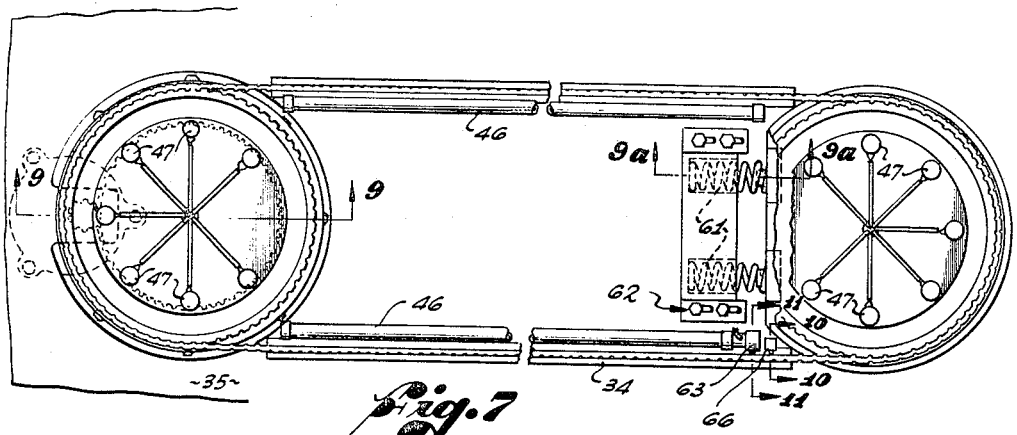
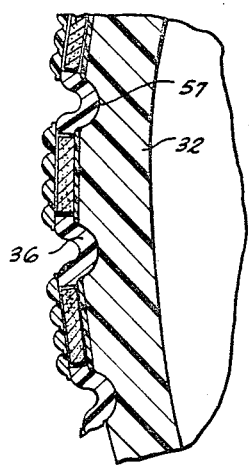
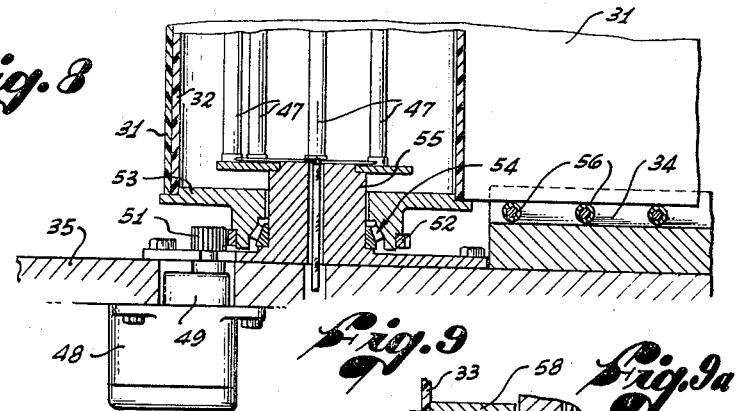
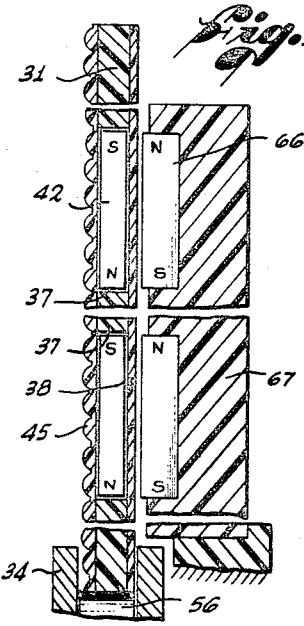
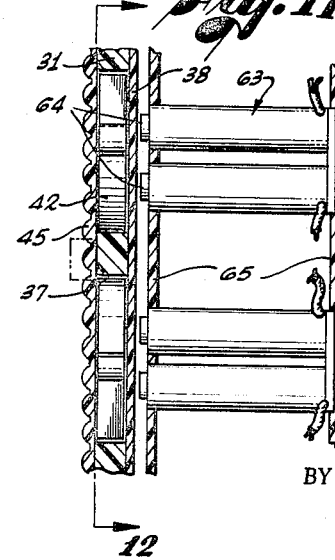
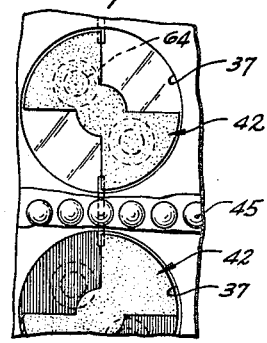
INVENTOR.
ROBERT P. NEWMAN
BY Fulwider, Patton, Rieber,
Lee, and Utecht
ATTORNEYS Aug. 15, 1967  R. P. NEWMAN  3,335,512
ILLUMINATED SIGN
Filed Aug. 30, 1965  5 Sheets-Sheet 3
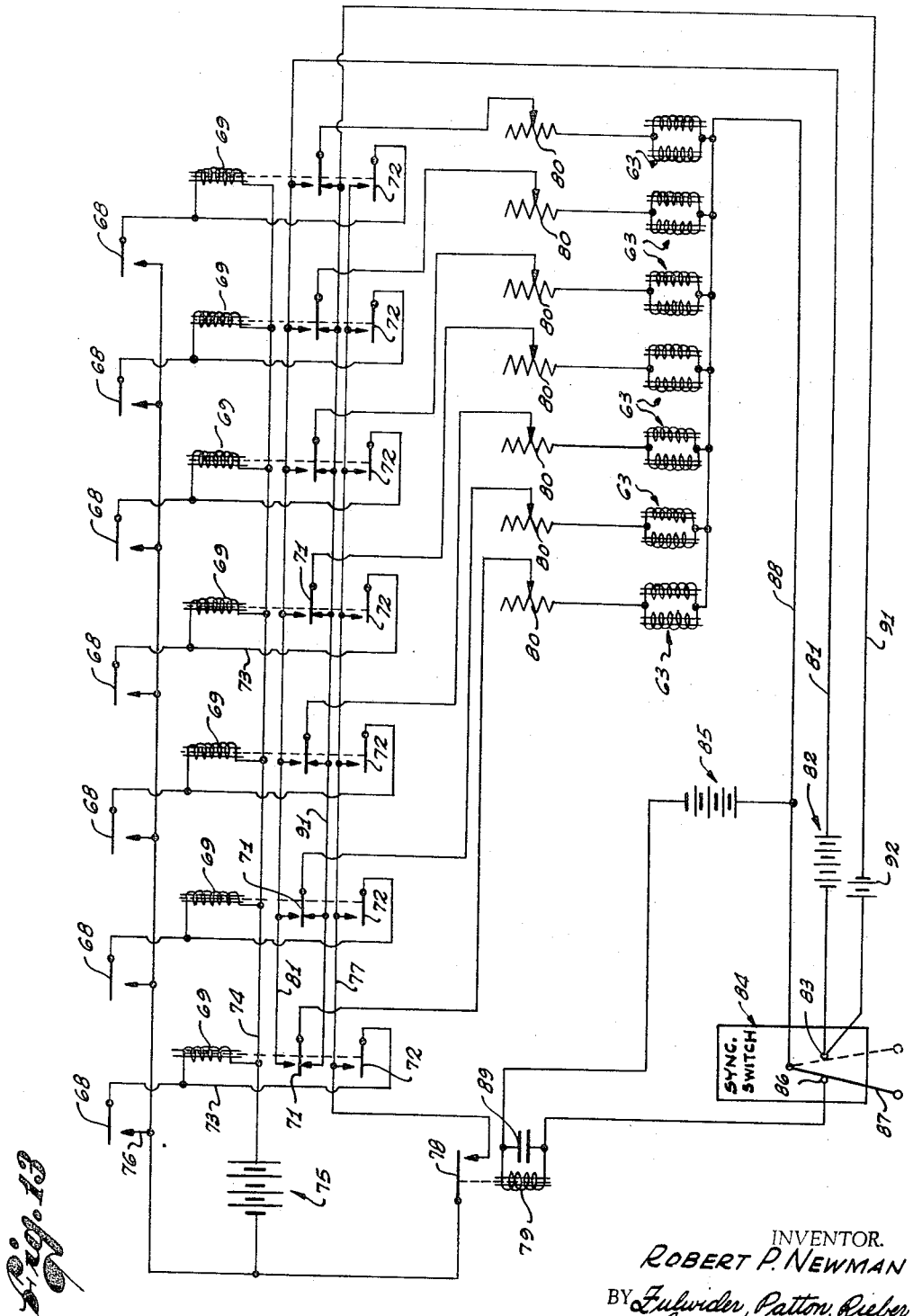
INVENTOR.
ROBERT P. NEWMAN
BY Fulwider, Patton, Rieber
Lee and Utecht
ATTORNEYS

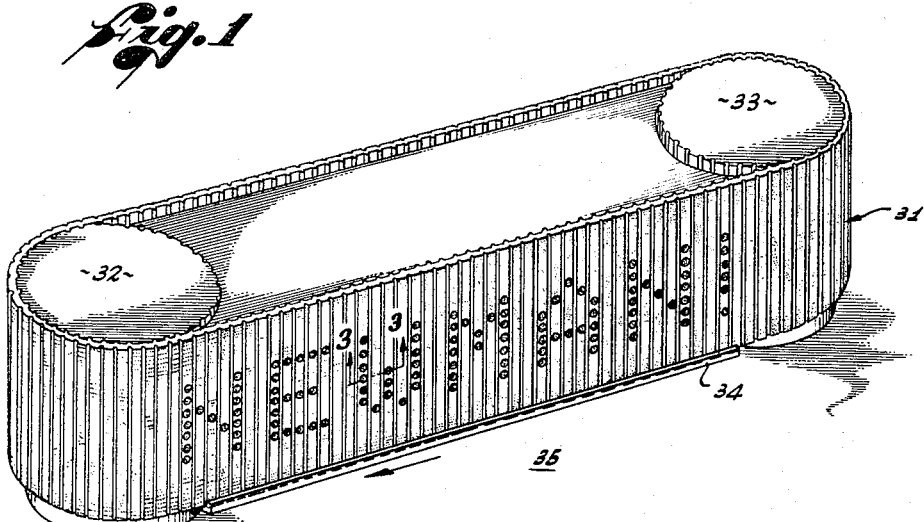
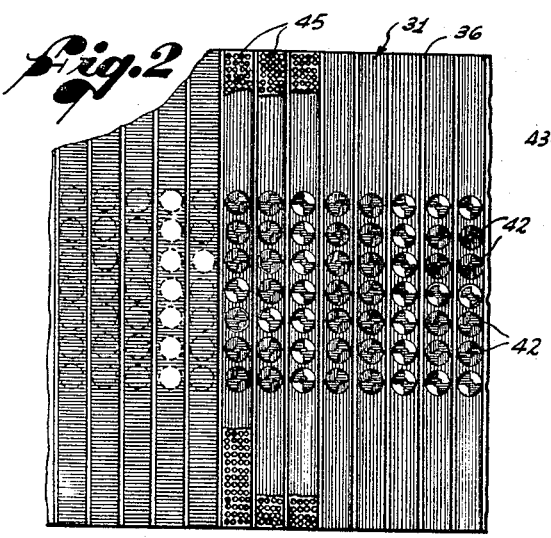
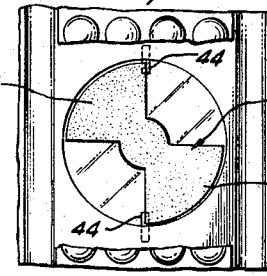
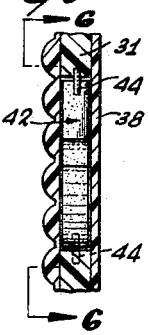
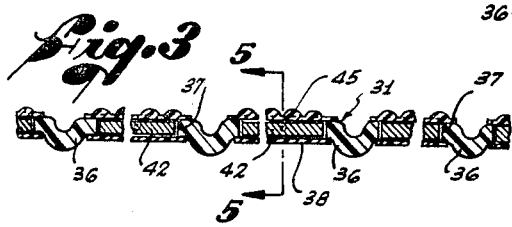
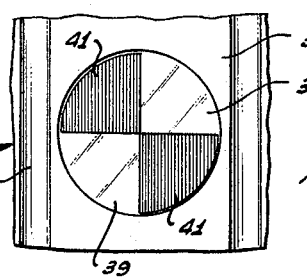

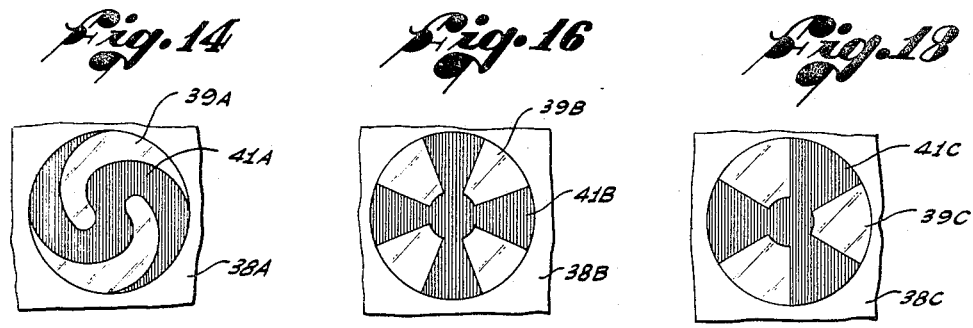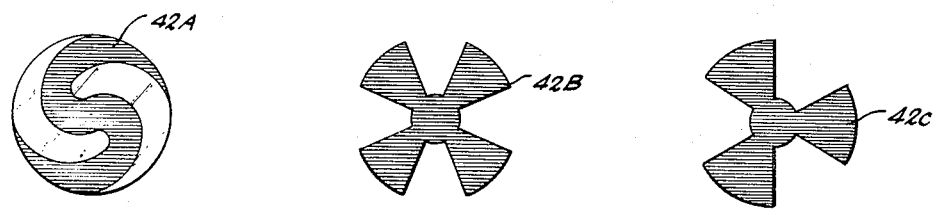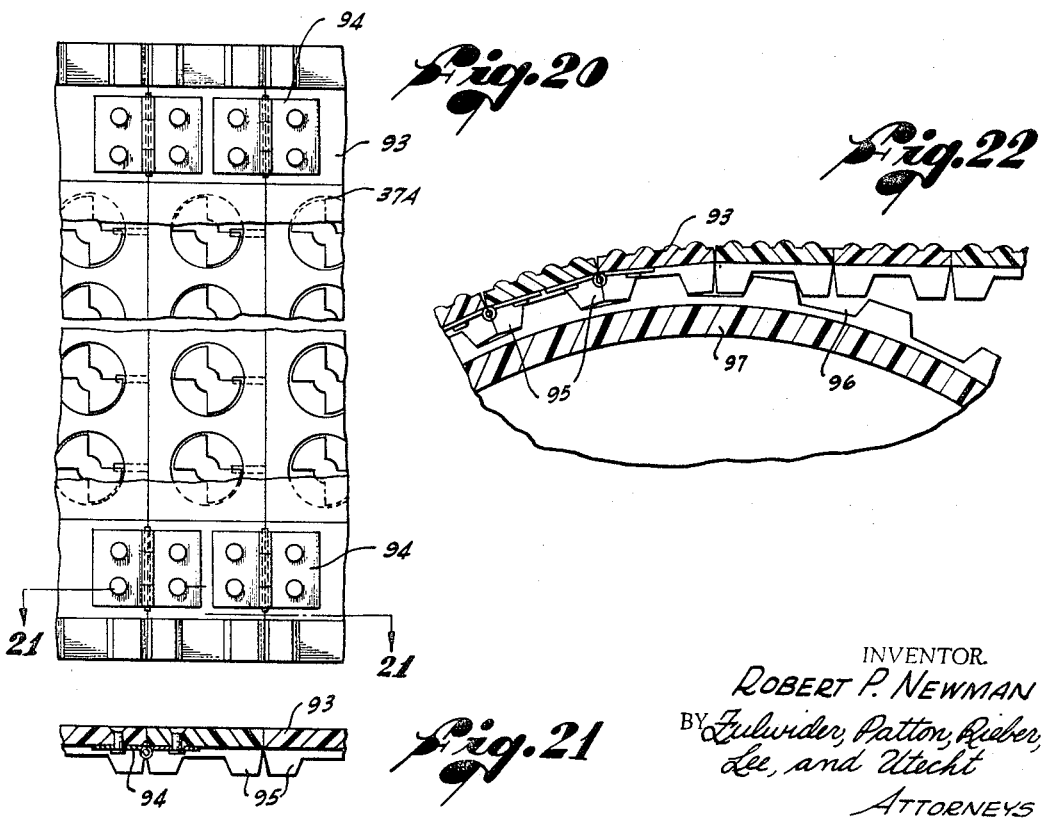

Aug. 15, 1967     R. P. NEWMAN     3,335,512
ILLUMINATED SIGN
Filed Aug. 30, 1965     5 Sheets-Sheet 5
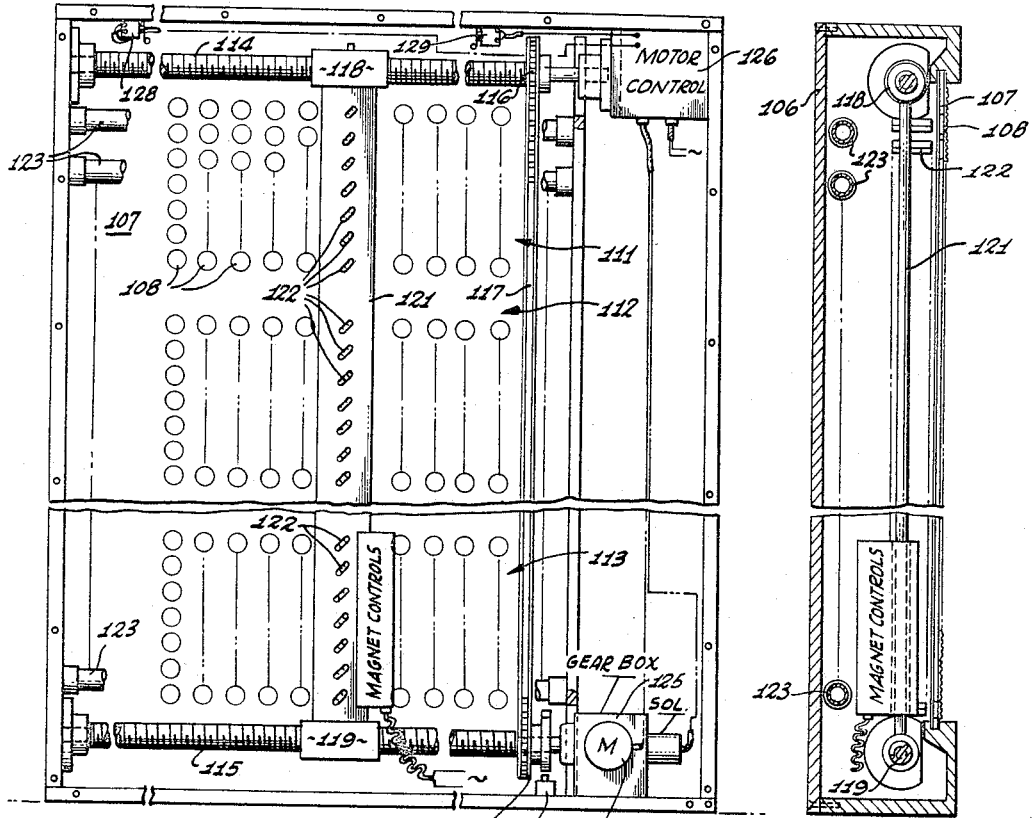
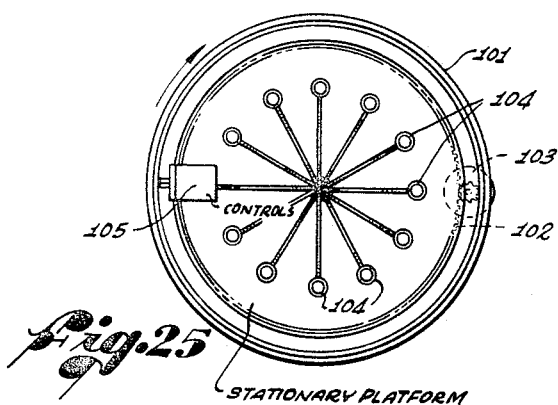
INVENTOR.
ROBERT P. NEWMAN
BY Fulwider, Patton, Rieber
Lee, and Utecht
ATTORNEYS

United States Patent Office 3,335,512
Patented Aug. 15, 1967

3,335,512
ILLUMINATED SIGN
Robert P. Newman, 4329 Gentry Ave.,
Studio City, Calif. 91604
Filed Aug. 30, 1965, Ser. No. 483,702
20 Claims. (Cl. 40—52)

The present invention relates to illuminated signs of the type conveying a message to the viewer, which message may be set up at a distance in a desired pattern without requiring access to the sign for placement of letters or figures or parts thereof.

In a preferred embodiment, a plurality of flat shutters are arranged in a mosaic in front of a light source and the shutters are selectively moved as armatures by energized encoding electromagnets to selectively uncover openings or windows through which the light source may shine to establish a meaningful letter or figure to view. Only one electromagnet for each line of shutters and windows is required and the sign may be in the form of a traveling belt which moves across a column of electromagnets which are selectively energized in a sequence to rotate the selected armature shutters traveling thereacross to uncover the windows required to establish the desired letters or figures. In this embodiment, the sign is a traveling one in which the message to be disseminated travels across the sign proper by physical motion of a belt or the like in which the windows and armature shutters are incorporated.

Alternatively, the sign may be relatively stationary, in which case the armature shutters and the window openings covered hereby remain stationary and the electromagnets for rotating the armature shutters move across the sign to rotate selected shutters and uncover the corresponding windows to form the desired letters or figures to view.

The armature shutters are preferably of flat, plate-like form and rotate about axes at right angles to their planes. They conform in shape to the shape of the window openings through which the light source is to shine and may be either in the form of magnetic material or of magnetized permanent magnet material, and are rotated by association by relative movement with an energized setting electromagnet for the ordinarily horizontal row in which the particular armature shutter is located. Where a particular shutter is to remain closed, the electromagnet will be deenergized while associated with that shutter. Where made of permanent magnet material, the armature shutters may engage soft iron pins or the like in their extreme positions so as to be bistable in either their fully open or fully closed position to which they have been moved.

In addition to setting or encoding electromagnets which are selectively energized or de-energized in a pattern to form a desired letter or figure on the sign, a set of permanent magnets may be provided, one for each horizontal row of shutters, which magnets operate to erase the message placed on the sign by moving the armature shutters to their closed positions as the magnets and shutters are associated in their relative movement.

The sign mosaic provided by the window openings and the armature shutters which selectively close them is desirably located in front of a suitable light source which is to shine through the windows. Suitable sources are electroluminescent plates, neon tubes, fluorescent tubes, filament light bulbs, tilted reflecting mirrors, or the like.

In order to make the line of a letter or figure which is placed on the sign more continuous, it is desired that the light coming through each uncovered window opening be diffused. For this purpose, a transparent or translucent plate which is frosted, dimpled or the like, is placed in front of the window openings. This, together with a broad illuminating area behind the sign, spreads the light into a more continuous line, rather than a series of sharply discontinuous dots.

Both traveling and stationary signs are known which employ a mosaic of light bulbs which are multiplexed from a central control, and also known are arrangements in which shutters or elements of contrasting appearance are moved from a central control. However, none of these prior part arrangements is characterized by the reliability, low initial and maintenance costs, high visibility and versatility of operation provided by the constructions of the present invention. Low power is a further characteristic of the present invention, since once the armature shutters have been rotated to a given position, they will remain in this position without the application of power. Only small power is required to energize an encoding electromagnet to initially rotate an armature shutter and the electromagnet is thereafter de-energized until another armature shutter in the same row is to be moved to open position.

The characters set into the belt for a sign are continuously erased as they pass the permanent magnet erasing elements which move all open armature shutters into closed position. This is preparatory to the forming of a new character, which may be the same as that previously messaged on the sign by the encoding electromagnets. In the case of a stationary sign, the message thereon can readily be erased by sweeping an erasing permanent magnet or oppositely energized electromagnet across the rows of armature shutters forming the sign matrix.

It will be apparent that the signs of the present invention are of general application, of which a few uses are for the outside of buildings, on theater marquees, in public and semi-public interiors, such as stations, airports, bars, stores and the like places, for the dissemination of topical information such as news headlines, traffic advice, contest scores, departures and arrivals, stock market reports, sales bargains, and the like. It could give pre-recorded and lengthy statements to patrons of shows, fairs and exhibits and in night windows.

It can further readily be seen that the setting and encoding of electromagnets can be energized in response to a multiplex broadcast signal or one translated over telephone wires, or from magnetic tape or other recorded signals, such as perforated tape or the like, including photoelectric cell response from a film loop tape or a revolving disc. All such sources of information for energizing the encoding electromagnets are considered to be within the scope of the present invention which lends itself to an almost unlimited variety of means for transmitting intelligent signals to the electromagnets to set up the proper image of letter or figure on the sign.

Furthermore, there is no limit to the size of the display sign of this invention, as it may vary from a small size for buses, private automobiles and airplanes, to very large signs, as in football stadia, baseball fields and on tall buildings.

It is, therefore, a primary object of the present invention to provide an improved, economical, reliable and versatile illuminated sign of either traveling or stationary form.

Another object of the invention is the provision of an improved, versatile, reliable, convenient and remotely operated illuminated sign of either traveling or stationary operation and construction.

Another object of this invention is the provision of an improved illuminated sign having a mosaic of relatively small window openings illuminated by a back light source in which the openings are closed by armature shutters which are opened by electromagnets selectively energized from a remote point.

A further object of this invention is the provision of an improved illuminated sign embodying a mosaic of relatively small window openings closed by shutters selectively and remotely operated to open position, including a light diffusing medium in front of the openings which tends to spread out the light passing through the openings from a back light source.

A still further object of this invention is the provision of an improved traveling illuminating sign in the form of a continuous belt of generally opaque nature having a mosaic of small window openings therethrough closed by shutters and having an illuminating light source at the back of the belt, together with remote control means for moving selected shutters to open position at one location only on the sign so as to form a predetermined traveling image on the belt from the light passing through the uncovered window openings.

Another object of this invention is the provision in an improved traveling belt sign having a generally opaque construction with a mosaic of small window openings therethrough, a light source behind the belt to illuminate the openings, and armature shutters for selectively covering and uncovering the openings, of a single encoding electromagnet for each row of shutters for selectively opening or not opening them in succession as the shutters and the electromagnets pass relative to each other.

A still further object of this invention is an improved illuminated traveling sign in accordance with the immediately preceding object including a plurality of permanent magnets, one for each row of armature shutters, for moving all opened shutters to closed postiion as they pass the permanent magnets to erase the image placed on the traveling belt by the encoding electromagnets.

Other objects and features of the invention will be apparent to those skilled in the art from the following specification and the appended drawing, in which:

FIGURE 1 is a perspective view of a traveling belt form of sign according to the present invention;

FIGURE 2 is an enlarged detail elevational view with parts broken away to shown the internal belt construction;

FIGURE 3 is an enlarged longitudinal sectional view through the belt;

FIGURE 4 is another enlarged elevational plan view with parts broken away of one of the image producing window and shutter elements of the sign mosaic;

FIGURE 5 is an enlarged sectional view on the line 5—5 of FIGURE 3;

FIGURE 6 is a sectional view on the line 6—6 of FIGURE 5;

FIGURE 7 is a plan view of a traveling belt sign according to the present invention with cover parts broken away;

FIGURE 8 is an enlarged partial horizontal sectional view showing the sprocket-like interlocking between transverse belt ribs and an end drum over which the belt rotates;

FIGURE 9 is a vertical sectional view at 9—9 of FIGURE 7 showing the drum and belt drive;

FIGURE 9a is a detail sectional view on the line 9a—9a of FIGURE 7;

FIGURE 10 is a partial vertical sectional view through the belt and the permanent magnets for erasing a set image;

FIGURE 11 is a partial vertical sectional view through the belt and the setting and encoding electromagnets;

FIGURE 12 is a sectional view on the line 12—12 of FIGURE 11;

FIGURE 13 is a simplified wiring diagram of one manner of controlling the illuminated traveling sign according to the present invention from a manually operated console;

FIGURES 14 and 15 represent, respectively, views of a modified form of window opening for the sign and of an armature shutter therefor;

FIGURES 16 and 17 represent, respectively, further modified shapes for the window openings and the armature shutters therefor;

FIGURES 18 and 19 represent, respectively, still further modified forms for the window openings and the armature shutters therefor;

FIGURE 20 is a partial elevational view of a modified form of traveling belt sign made up of rigid, articulated plates for the individual vertical rows of the sign mosaic;

FIGURE 21 is a sectional view on the lines 21—21 of FIGURE 20;

FIGURE 22 is a partial horizontal sectional view showing the synchronizing interlocking of the articulated plates of the belt of FIGURES 20 and 21 with the operating drum over which the belt rides;

FIGURE 23 is a mostly diagrammatic, rear elevational representation of a stationary form of sign according to the present invention over which the setting and encoding electromagnets travel to establish a desired image in the sign;

FIGURE 24 is an end elevational view of the sign of FIGURE 23; and

FIGURE 25 is a diagrammatic representation of another form of traveling illuminated sign according to the present invention of continuous circular form.

While any number of rows of individual window and shutter elements may be used in a sign according to the present invention to establish a letter or figure image to convey desired information, seven superposed horizontal rows have been selected for illustration herein as these are ample to form intelligible alphanumeric figures. It will readily be understood, however, that any number of vertical sets may be used in a composite sign to form a multi-line message as desired.

Referring first to the form of the invention illustrated in FIGURES 1 through 13, an endless traveling belt 31 passes around a pair of supporting drums 32 and 33 and is supported intermediate the drums within channels 34, the drums and channels being mounted on any support, such as a table 35. The endless traveling belt 31 may desirably be made out of opaque polystyrene plastic having a plurality of regularly spaced transverse ribs 36 formed therein throughout its length. Between the ribs 36 the belt is provided with circular cutouts or holes 37 therethrough, these holes being closely spaced both horizontally and vertically in a mosaic arrangement to form horizontal and vertical rows. On the inside face of the belt 31 the holes 37 are closed by transparent-opaque plates 38 which may be cemented or otherwise attached to the belt surface between the ribs 36. The plates 38, as shown in FIGURE 6, have pairs of opposed transparent window quadrants 39 and pairs of opposed opaque quadrants 41 for each hole 37. Within the holes 37 are disposed butterfly-shaped shutters 42 providing a pair of quadrants 43 of a size to close off or obscure the window openings 39. The shutters 42 form the rotatable armatures previously discussed and have their circumferences freely received within the holes 37 so as to be rotatable therein.

The shutters 42 are of thin sheet materal and may be of soft iron magnetic material, but preferably are permanent magnets. As permanent magnets they may be made of thin sheet steel, or be formed of polyvinyl plastic in which a magnetic alloy powder is dispersed, or they may be of a magnetic rubber base material, all to be permanently magnetized to have north and south poles at the opposite quadrants 43. Supported in the belt 31 and extending into each hole 37 and into the path of the shutter 42 therein are a pair of soft iron pins 44 which are engaged by the magnetized shutter 42 in its opposite extreme positions to give it bistable open and closed positions. The shutter will thus be retained in the position to which it is moved by either the setting electromagnet or the erasing magnet so that the window openings 39 will be neither covered nor uncovered inadvertently.

In front of the holes 37, between the lines of the ribs 36, are cemented or otherwise mounted diffuser plates 45 which have a frosted or pebbled surface, or the like, to spread the light from the small window openings 39 into fuller, line-like representations for a more continuous delineation of the image, alphanumerical or figure, placed upon the traveling belt. The shutters 42 are thereby retained freely within the holes 37 between the back plates 38 and the front plates 45.

As stated before, any desired light source may be used behind the rear surface of the belt to shine through the window openings 39. Horizontal tubes 46 are shown in FIGURE 7 extending along the main length of the belt 31, which tubes may be plural in number and disposed in superposed relation to give a broad illuminating area. These tubes may be neon or fluorescent, although luminescent plates, filament light bulbs, and mirrors reflecting light from another source are all suitable for use. The drums 32 and 33 are desirably of transparent plastic and vertically extending light tubes 47 (FIGURES 7 and 9) are disposed within the drums 32 and 33 so that the light therefrom will shine through the window openings 39 as the belt moves around the drum. The image on the belt may therefore be seen as it passes around the drums, as well as in the elongated portion of the belt at both sides of the sign, thus providing a continuous viewing image throughout the entire length of the endless belt.

The drum 32 may be driven by an electric motor 48, mounted on the under side of the platform 35, through a reduction gear box 49 to a pinion 51 driving a ring gear 52 mounted on the supporting base 53 for the drum 32. The drum is mounted for rotation at the bearings 54 on a stationary pedestal 55 which also serves to support the lamps 47 stationary within the drum. The straight portions of the belt 31 are supported at their lower edge within channels 34 which may have a plurality of spaced transverse rollers 56 therein on which the edge of the belt 31 rests (FIGURE 9) to prevent sagging and distortion.

While the belt 31 may have a simple friction engagement with the drums 32 and 33, the transverse ribs 36 form a means of interlocking the belt with the drums. The exterior surfaces of the drums are provided with longitudinal grooves 57 complementary to and spaced apart to exactly receive the ribs 36 on the belt 31, as shown in FIGURE 8. The drums thus have a sprocket-like, positive engagement with the belt whereby movements of the drums and belt are synchronized against slippage. The ribs 36 also perform a synchronizing function in the energization of the encoding electromagnets, as will be explained more fully hereinafter in connection with the simplified wiring diagram for the operation of the sign.

To maintain the belt 31 in tension, the base 58 of the drum 33 is rotatably mounted on a support 59 which has a limited sliding movement relative to the table 35 and is biased away from the drum 32 by means of a pair of springs 61 to maintain the belt 31 in tension. The tension on the belt may be adjusted by any means—a simple device being the stud and slot connection at 62 which mounts the holder for the springs 61.

The encoding electromagnets 63 are shown as U-shaped in magnetic configuration with coils on both legs of the U establishing north and south poles at the pole faces 64 when energized. These magnet poles cooperate with the poles of the shuters 42 to rotate them as armatures into open position, uncovering the window openings 39. The electromagnets 63 are located in superposed relation in a vertical bank, with one electromagnet to each horizontal row of shutters 42. The electromagnets 63 are selectively energized when opposite a vertical row of shutters 42 and each energized electromagnet will move its corresponding shutter into the open position. As shown in the upper portion of FIGURE 12, the electromagnet pole faces 64 and shutter 42 are related as they appear after energization of the electromagnet 63 has moved the armature shutter 42 into open position. At the lower broken off portion of FIGURE 12 the electromagnet thereat has not been energized and the shutter 42 remains in closed position. In either position the armature shutter will engage a pin 44 to be held against involuntary closing and opening movements. The electromagnets 63 may be mounted in any desired manner, shown simply in FIGURE 11 as disposed between a pair of parallel mounting plates 65.

Located adjacent the electromagnets 63, upstream of the moving belt, are the erasing permanent magnets 66. These are also located in a vertical row in superposed relation and are each individual to a horizontal row of the armature shuiters 42. The permanent magnets 66 may be mounted in any desired way, being shown in FIGURE 10 more or less diagrammatically as partially embedded within a plastic bar 67 which is rigidly mounted on a supporting structure. The permanent magnets 66 are so polarized with respect to the armature shutters 42 that they move the armature shutters positively to window-closing position as the armature shutters pass by the permanent magnet location. This erases from the belt the image, whether letters, numbers, figures or designs, which was placed on the belt by the encoding electromagnets 63. Therefore, all of the armature shutters 42 are presented to the encoding electromagnets 63 in closed position.

FIGURE 13 shows a simplified wiring diagram for operating the illuminated sign of the present invention, as from a manual console having seven momentary switching contacts 68. These individually control electric relays 69 having movable contacts 71 and 72, the movable contact 71 being double throw with a normally closed position, and the movable contact 72 being single throw, normally open. The contacts 68 connect to lines 73 which are connected to one side of the operating coils 69 and to the movable contacts 72. The other sides of the relay coils connect to a common line 74 which is connected to one terminal of a battery 75. The other terminal of the battery 75 is connected to the stationary contacts 76 engaged by the switching contact 68.

When a contact 68 is momentarily closed, the corresponding relay 69 operates to close its normally open contacts at 71 and 72. Closing of contact 72 connects a line 77 through contact 78 of relay 79 to battery 75 to form a holding circuit for the relay 69. The closing of contact 71 connects the associated encoding electromagnet 63 to a line 81 through a variable resistor 80 which has been previously set to limit the current through the electromagnet 63 to a desired value. The line 81 is connected to one terminal of a battery 82, the other terminal of which connects to a stationary contact 83 of a synchronizing switch 84.

Contact 78 is closed by the energization of relay 79 from battery 85 through the normally closed contact 86 of the synchronizing switch 84. The movable contact 87 of synchronizing switch 84 normally engages contact 86, but is moved to engage contact 83 by each rib 36 on the belt 31 passing it. The synchronizing switch 84 is so located with respect to the ribs 36 on the belt 31 that the proper sequence of contact opening and closing will be effected to secure energization of the encoding electromagnets 63 when a vertical row of armature shutters 42 is positioned opposite them. When the contact 87 engages the contact 83, a circuit is completed from battery 83 through lines 81 and 88 to each encoding electromagnet 63 whose contact 68 is closed. This effects rotation of the corresponding armature shutter 42 to open position.

As contact 87 is moved by a rib 36, the circuit from battery 85 to relay 79 is opened, but contact 78 remains closed for a predetermined period of time by delay in the decay of flux in relay 79 caused by the capacitor 89 connected across the energizing coil of the relay. This predetermined time delay maintains the holding circuits about the switching contacts 68 until the energized encoding electromagnets 63 effect opening of their associated armature shutters 42. After this predetermined time delay, contact 78 opens the holding circuits, and with switches 68 open, relays 69 open, contacts 71 and 72 go to their normal positions with contacts 71 opening the circuits to line 81 and closing the circuits to line 81, the energization of the encoding electromagnets 63 from battery 82 is terminated.

The closing of the circuit to line 91 places a small reverse polarity energization on the electromagnets 63 from a low voltage battery 92 to insure that no residual magnetism remains in the electromagnets 63. This reverse bias is a refinement which may or may not be desirable, and may be entirely omitted if the residual is so small that encoding electromagnets 63 function properly without it. In any event, it must not reversely energize the electromagnets to close the armature shutters, and is not to be considered as limiting or required in the exercise of this invention.

When the rib 36 which actuated the movable contact 87 on synchronizing switch 84 passes by, contact 87 automatically returns to its position engaging contact 86. Thereby all circuits to the electromagnets 63 are opened and the circuit to relay 79 is closed to close contact 78 in preparation for another encoding operation. It will be clear from an inspection of the diagram that the switching contacts 68 may be manipulated so that any one, any number including all, or none of the electromagnets 63 may be energized when in coincidence with a vertical row of the armature shutters 42 to selectively open or leave in closed position any and all of the shutters in that vertical row.

FIGURES 14 and 15 show modified cooperating forms for the window openings and the armature shutters closing and opening them to produce a desired sign image. Here the opaque-transparent plate at 38A has a pair of spiraling transparent window openings 39A cooperating with opaque portions 41A. The armature shutter at 42A has a complementary configuration so as to close off the window openings 39A in one position, and to coincide with the opaque portions 41A in open position.

In FIGURES 16 and 17, the opaque-transparent sheet 38B has transparent window openings 39B between opaque portions 41B in the general form of a Maltese cross. The armature shutter 42B has a complementary configuration of a Maltese cross to close off the window openings 39B in one position and to index with the opaque portions 41B in its open position.

FIGURES 18 and 19 show a still further varied configuration for the window openings and shutters in which the opaque-transparent sheet 38C has transparent window openings 39C therethrough defined by opaque portions 41C in a Y-shaped configuration, while the armature shutter 42C has a complementary Y-shaped configuration to close the transparent openings 39C in one of its bistable positions and to index with the opaque portions 41C in its opposite, open position.

FIGURES 20–22 show a modified arrangement for an endless belt of a traveling sign according to the present invention. Here the belt is made up of narrow, elongated plates 93 of rigid opaque material hinged to adjacent plates at top and bottom by hinges 94. The plates 93 have integral projecting legs 95 at their top and bottom, with the legs on adjacent plates 93 received within notches 96 in a drum 97 whose external configuration provides the notches 96 and is otherwise the same as the drums 32, 33 of the preferred embodiment. Holes 37A are located in closely adjacent, superposed relation in each plate 93 in the same manner as the holes 37 in the flexible plastic belt of the preferred embodiment, and the same opaque-transparent plates 38 and diffusing plates 45 close the holes 37A with the armature shutters therein, as previously described for the preferred embodiment. The legs 95 are formed with clearance, as shown in FIGURES 21 and 22, to facilitate curvature of the belt of plates 93 about its drum 97. Other features of the preferred flexible belt embodiment and the simplified wiring diagram of FIGURE 13 apply equally as well to the belt of FIGURES 20–21.

FIGURE 25 shows diagrammatically another form which the traveling sign of this invention may take in which the lighted image appears on a rigid circular wheel 101 attached to a ring gear 102 to be driven by a motor 103. Light behind the wheel 101 is provided by vertical illuminating tubes 104. The encoding electromagnets and erasing magnets are shown only diagrammatically at 105 at one point on the circumference of the wheel 101. FIGURE 25 is a plan view so that the axis of rotation of the wheel 101 is vertical, as are the illuminating tubes 104. A sign matrix is provided in the periphery of the wheel 101 similar to that provided in the flexible belt previously disclosed, including a plurality of closely adjacent, superposed, vertical rows of holes 37, which also form horizontal rows, and in which are disposed rotatable armature shutters 42. The openings 37 will again be closed by opaque-transparent sheets 38 on the inside and by diffusing plates 45 at the outside of the wheel 101 and the operation is the same, by means of an encoding control such as shown in FIGURE 13. This form permits the sign to be used with equal effect substantially about the circumference of the wheel 101. Other details of construction and support of the wheel sign may be in conventional arrangement.

FIGURES 23 and 24 more or less diagrammatically show a stationary sign made up of a plurality of message lines, each message line being formed by a seven-row matrix as previously described. It will, of course, be understood that the sign may have any number of message lines, or a single message line, as desired. In this arrangement, there is provided an enclosing cabinet 106 whose front is an opaque plate 107 having a plurality of holes 108 therethrough in which are disposed the armature shutters 42 and which are closed at the rear side by the opaque-transparent plates 38 and at the front by the diffuser plates 45. The message lines are shown as three in number at 111, 112 and 113, with each message line composed of several horizontal rows of light-producing and controlling elements formed by the holes 108 and the shutters 42 therein.

A pair of lead screws 114, 115 are disposed adjacent the top and bottom of the cabinet or box 106 and extending along its length. The two lead screws are rigidly connected to sprockets 116 between which extends a chain 117 for effecting concurrent rotation of the lead screws. Vertically aligned traveling nuts 118 and 119 are mounted on the lead screws 114 and 115, respectively. Supported between the traveling nuts 118 and 119 is a rigid plate 121 upon which are mounted superposed encoding electromagnets 122 equal in number to the number of rows of holes 108 and disposed in horizontal alignment therewith. Behind the opaque plate 107 are mounted a plurality of horizontal, superposed illuminating tubes 123 to supply a board illuminating area for the message lines of the sign.

The lead screws 114 and 115 are driven in tandem from a motor 124 through a gear box 125 under a motor control 126 which may include, if desired, a synchonizing or stop switch 127 for either synchronizing the energization of the encoding electromagnets 122 with their position opposite a vertical row of holes 108 or for stopping rotation of the lead screws 114 and 115 when the electromagnets 122 are indexed with each vertical row of holes 108. Limit switches 128 and 129 may by conventional circuitry limit the extremes of travel of the traveling nuts 118 and 119 in opposite directions.

The electric circuit of the multi-line stationary sign may take any form. For example, all the lines could be set in one pass of the electromagnets by individually controlling each of the twenty-one or more electromagnets shown in the drawing at the same time. Since this would complicate the wiring arrangement, it may be preferred to set each message line separately by controlling only the seven electromagnets therein and provide a conventional stepping switch (not shown) for moving the electromagnet control from one message line to the next, thus simplifying the wiring diagram. Also, the motor control 126 can include means for speeding the movement of the electromagnets in the reverse direction when they are not performing an encoding operation. The erasing of the message image on the sign can be readily accomplished by reversing the polarity of energization of the electromagnets 122 and moving them across the sign. All of these features are considered to be within the province of the skilled electrician and it has not been thought necessary to burden the disclosure herein with details of exact wiring diagrams for each manner of operation.

The stationary sign of FIGURES 23 and 24 has particular application where a sign is to be set up and continue with selected information thereon for a reasonable period of time. For example, on theater marquees and on buildings for announcing present and future events, the arrangement provides great economies over the manual placement of letters, over control of individual bulbs which may burn out at random, and particularly in the availability in the sign of any number of alphanumeric characters without the necessity of maintaining an inventory conforming to the maximum number of each which might be needed. The inventory and manpower savings with respect to this stationary sign are exceptional, even though the moving feature is not utilized.

In all embodiments, the covers or plates 38 and the shutters 42 may be formed of polarized material which in one extreme position of the shutters passes light and in the other extreme position cuts it off. Magnetic or permanent magnet elements may be embedded in the rotary shutter. The terms "transparent and opaque portions" and "shutter" in the claims are to be construed to cover this construction.

While certain preferred embodiments of the invention have been specifically illustrated and described, it is understood that the invention is not limted thereto as many variations will be apparent to those skilled in the art, and the invention is to be given its broadest interpretation with in the terms of the following claims.

I claim:

1. An illuminated sign comprising: an opaque, relatively thin member on which the sign is displayed, said member having a plurality of window openings therethrough arranged generally in rows along two right angle axes; illuminating means in back of said member for lighting said window openings; an opaque-transparent cover for each of said window openings with the transparent and opaque portions of the covers arranged in a complementary pattern; flat, plate-like shutters disposed in said window openings and being shaped complementary to said transparent portions of said window covers so as to close off the transparent portions of the covers in one position of the shutters and to open said transparent portions in another position of the shutters; a single row of encoding electromagnets extending along one row axis of said window openings and conforming in number to the number of openings along said row axis and positioned in alignment with the axes of the rows at right angles thereto, said shutters being formed of magnetic material and being responsive to the energization of an encoding electromagnet positioned adjacent thereto to rotate the associated shutter as an armature about a central axis at right angles to its plane to the position opening the transparent portion of its window opening cover; means for effecting relative movement between said encoding electromagnets and said opaque member along the window opening row axis at right angles to the axis in which said encoding electromagnets extend; and means for selectively energizing said electromagnets when indexed with the window openings so as to form a desired sign image against the background of said opaque member.

2. An illuminated sign comprising: an opaque, relatively thin member on which the sign is displayed, said member having a plurality of window openings therethrough arranged generally in rows along two right angle axes; illuminating means in back of said member for lighting said window openings; an opaque-transparent cover for each of said window openings with the transparent and opaque portions of the covers arranged in a complementary pattern; flat, plate-like shutters disposed in said window openings and being shaped complementary to said transparent portions of said window covers so as to close off the transparent portions of the covers in one extreme position of the shutters and to open said transparent portions in the other extreme position of the shutters; means for holding said shutters in either extreme position to which they are moved; a single row of encoding electromagnets extending along one row axis of said window openings and conforming in number to the number of openings along said row axis and positioned in alignment with the axes of the rows at right angles thereto, said shutters being formed of magnetic material and being responsive to the energization of an encoding electromagnet positioned adjacent thereto to rotate the associated shutters as an armature about a central axis at right angles to its plane to its extreme position opening the transparent portion of its window opening cover; means for effecting relative movement between said encoding electromagnets and said opaque member along the window opening row axis at right angles to the axis in which said encoding electromagnets extend; and means for selectively energizing said electromagnets when indexed with the window openings so as to form a desired sign image against the background of said opaque member.

3. An illuminated sign comprising: an opaque relatively thin member on which the sign is displayed, said member having a plurality of window openings therethrough arranged generally in rows along two right angle axes; illuminating means in back of said member for lighting said window openings; an opaque-transparent cover for each of said window openings with the transparent and opaque portions of the covers arranged in a complementary pattern; flat, plate-like shutters disposed in said window openings and being shaped complementary to said transparent portions of said window covers so as to close off the transparent portions of the covers in one position of the shutters and to open said transparent portions in another position of the shutters; a single row of encoding electromagnets extending along one row axis of said window openings and conforming in number to the number of openings along said row axis and positioned in alignment with the axes of the rows at right angles thereto, said shutters being formed of magnetic material and being responsive to the energization of an encoding electromagnet positioned adjacent thereto to rotate the associated shutter as an armature about a central axis at right angles to its plane to the position opening the transparent portion of its window opening cover; means for effecting relative movement between said encoding electromagnets and said opaque member along the window opening row axis at right angles to the axis in which said encoding electromagnets extend; means for selectively energizing said electromagnets when indexed with the window openings so as to form a desired sign image against the background of said opaque member; and light diffusing means on the front side of said window openings to spread the light passing through said transparent cover portions into a more continuous line.

4. An illuminated sign comprising: an opaque, relatively thin member on which the sign is displayed, said member having a plurality of window openings therethrough arranged generally in rows along two right angle axes; illuminating means in back of said member for lighting said window openings; an opaque-transparent cover for each of said window openings with the transparent and opaque portions of the covers arranged in a complementary pattern; flat, plate-like shutters disposed in said window openings and being shaped complementary to said transparent portions of said window covers so as to close off the transparent portions of the covers in one position of the shutters and to open said transparent portions in another position of the shutters; a single row of encoding electromagnets extending along one row axis of said window openings and conforming in number to the number of openings along said row axis and positioned in alignment with the axes of the rows at right angles thereto, said shutters being formed of magnetic material and being responsive to the energization of an encoding electromagnet positioned adjacent thereto to rotate the associated shutter as an armature about a central axis at right angles to its plane to the position opening the transparent portion of its window opening cover; means for effecting relative movement between said encoding electromagnets and said opaque member along the window opening row axes at right angles to the axes in which said encoding electromagnets extend; means for selectively energizing said electromagnets when indexed with the window openings so as to form a desired sign image against the background of said opaque member; and a light diffusing cover for the front side of said window openings, said opaque-transparent covers for said window openings being located at the back side thereof, and said shutters being mounted between said covers in said window openings and freely rotatable therein.

5. An illuminated sign comprising: an opaque, relatively thin member on which the sign is displayed, said member having a plurality of window openings therethrough arranged generally in rows along two right angle axes; illuminating means in back of said member for lighting said window openings; an opaque-transparent cover for each of said window openings with the transparent and opaque portions of the covers arranged in a complementary pattern; flat, plate-like shutters disposed in said window openings and being shaped complementary to said transparent portions of said window covers so as to close off the transparent portions of the covers in one position of the shutters and to open said transparent portions in another position of the shutters; a single row of encoding electromagnets extending along one row axis of said window openings and conforming in number to the number of openings along said row axis and positioned in alignment with the axes of the rows at right angles thereto, said shutters being permanently magnetized with opposite poles adjacent opposite edges thereof and being responsive to the energization of an encoding electromagnet positioned adjacent thereto to rotate the associated shutter as an armature about a central axis at right angles to its plane to the position opening the transparent portion of its window opening cover; means for effecting relative movement between said encoding electromagnets and said opaque member along the window opening row axis at right angles to the axis in which said encoding electromagnets extend; and means for selectively energizing said electromagnets when indexed with the window openings so as to form a desired sign image against the background of said opaque member.

6. An illuminated sign comprising: an opaque, relatively thin member on which the sign is displayed, said member having a plurality of window openings therethrough arranged generally in rows along two right angle axes; illuminating means in back of said member for lighting said window openings; an opaque-transparent cover for each of said window openings with the transparent and opaque portions of the covers arranged in a complementary pattern; flat, plate-like shutters disposed in said window openings and being shaped complementary to said transparent portions of said window covers so as to close off the transparent portions of the covers in one position of the shutters and to open said transparent portions in another position of the shutters; a single row of encoding electromagnets extending along one row axis of said window openings and conforming in number to the number of openings along said row axis and positioned in alignment with the axes of the rows at right angles thereto, said shutters being permanently magnetized with opposite poles adjacent opposite edges thereof and being responsive to the energization of an encoding electromagnet positioned adjacent thereto to rotate the associated shutter as an armature about a central axis at right angles to its plane to the position opening the transparent portion of its window opening cover; magnetic means associated with said window openings and cooperating with the magnetic poles of said shutters for holding them in either extreme position to which they are moved against involuntary movement therefrom; means for effecting relative movement between said encoding electromagnets and said opaque member along the window opening row axis at right angles to the axis in which said encoding electromagnets extend; and means for selectively energizing said electromagnets when indexed with the window openings so as to form a desired sign image against the background of said opaque member.

7. An illuminated sign comprising: an opaque, relatively thin member on which the sign is displayed, said member having a plurality of window openings therethrough arranged generally in rows along two right angle axes; illuminating means in back of said member for lighting said window openings; an opaque-transparent cover for each of said window openings with the transparent and opaque portions of the covers arranged in a complementary pattern; flat, plate-like shutters disposed in said window openings so as to be substantially coplanar with said opaque member and to be rotatable relative to said member within said window openings about axes substantially central of said window openings and at right angles to the plane of said opaque member and shutters, said shutters being shaped complementary to said transparent portions of said window covers so as to close off the transparent portions of the covers in one position of the shutters and to open said transparent portions in another position of the shutters; a single row of encoding electromagnets extending along one row axis of said window openings and conforming in number to the number of openings along said row axis and positioned in alignment with the axes of the rows at right angles thereto, said shutters being formed of magnetic material and being responsive to the energization of an encoding electromagnet positioned adjacent thereto to rotate the associated shutter as an armature about a central axis at right angles to its plane to the position opening the transparent portion of its window opening cover; means for effecting relative movement between said encoding electromagnets and said opaque member along the window opening row axis at right angles to the axis in which said encoding electromagnets extend; and means for selectively energizing said electromagnets when indexed with the window openings so as to form a desired sign image against the background of said opaque member.

8. The illuminated sign defined in claim 7 in which said opaque member is in the form of a continuous traveling belt with said illuminating means and said encoding electromagnets mounted within the loop of the belt and the axis in which said electromagnets are located extends transversely to the traveling axis of the belt.

9. The illuminated sign defined in claim 8 in which said belt is formed of a continuous strip of flexible, opaque, plastic material; rotary means about which the belt loop extends; and means for effecting rotation of said last-mentioned means and travel of the belt.

10. The illuminated sign as defined in claim 8 in which said belt is formed of a plurality of relatively narrow, transversely extending, rigid plates in which said window openings are mounted, there being provided one individual plate for each transverse row of window openings; means pivotally interconnecting said plates to provide flexibility of the belt; rotary means about which the belt loop extends; and means for effecting rotation of said rotary means to move said belt.

11. The illuminated sign defined in claim 9 in which said belt is provided with transversely extending ribs on its inner face, said rotary means having complementary grooves on its outer face interlocking with said belt grooves in substantially sprocket-like relation to prevent slippage between the belt and the rotary means.

12. The illuminated sign defined in claim 11 including electric switching means engageable by said belt ribs as they move therepast so as to synchronize the selective energization of said encoding electromagnets with the indexing of the window openings therewith.

13. The illuminated sign defined in claim 7 in which said opaque member is in the form of a stationary plate with said window openings arranged in groups of rows extending longitudinally of the member so as to form a plurality of lines of images on the member, there being an encoding electromagnet for each longitudinal row of window openings; means for moving said electromagnets rectilinearly across the back of said opaque plate member; and means for selectively energizing said electromagnets as they index with the window openings to place the sign image on said lines.

14. The illuminated sign as defined in claim 7 in which said opaque member is substantially cylindrical; and means for rotating said member to successively present the sign images with substantial uniformity to all viewer locations.

15. An illuminated sign comprising: an opaque, relatively thin member on which the sign is displayed, said member having a plurality of window openings therethrough arranged generally in rows along two right angle axes; illuminating means in back of said member for lighting said window openings; an opaque-transparent cover for each of said window openings with the transparent and opaque portions of the covers arranged in a complementary pattern; flat, plate-like shutters disposed in said window openings and being shaped complementary to said transparent portions of said window covers so as to close off the transparent portions of the covers in one position of the shutters and to open said transparent portions in another position of the shutters; a single row of encoding electromagnets extending along one row axis of said window openings and conforming in number to the number of openings along said row axis and positioned in alignment with the axes of the rows at right angles thereto, said shutters being formed of magnetic material and being responsive to the energization of an encoding electromagnet positioned adjacent thereto to rotate the associated shutter as an armature about a central axis at right angles to its plane to the position opening the transparent portion of its window opening cover; means for effecting relative movement between said encoding electromagnets and said opaque member along the window opening row axis at right angles to the axis in which said encoding electromagnets extend; means for selectively energizing said electromagnets when indexed with the window openings so as to form a desired sign image against the background of said opaque member; and a single row of erasing magnets extending parallel to said encoding electromagnets adjacent thereto and likewise conforming in number to the number of openings in the row axes parallel thereto and positioned in alignment with the axes of the rows at right angles thereto, said means for effecting relative movement between said encoding electromagnets and said opaque member producing like relative movement between said erasing magnets and said opaque member, said erasing magnets moving shutters passing thereby to their positions closing the transparent portions of said covers.

16. An illuminated sign comprising: an opaque, continuous loop, traveling belt; means within said belt loop for supporting the same and effecting travel thereof along its longitudinal axis, said belt having a plurality of window openings therethrough arranged generally in rows extending both along the longitudinal axis of the belt and transversely thereto; illuminating means within said belt loop for lighting said window openings; flat, planar, plate-like shutters disposed in said window openings so as to be coplanar with the plane of said belt and being freely rotatable within said openings about central axes at right angles to said plane; covers for said openings retaining said shutters therein for free rotation; at least the cover of the interior face of the belt having opaque-transparent portions arranged in a pattern complementary to said shutters so that in one extreme position of the shutters they close off the transparent portions of the cover and in their other extreme position open said transparent portions for the illuminating means to show therethrough; a single row of encoding electromagnets extending across said belt and conforming in number with the number of openings across the belt and positioned in alignment with the rows of openings extending longitudinally of the belt; said shutters being formed as permanent magnets with their opposite poles adjacent opposite edges thereof, being responsive to the energization of an encoding electromagnet positioned adjacent thereto to rotate the associated shutter as an armature to its extreme position opening the transparent portion of its window; and means for selectively energizing said electromagnets when indexed with the window openings so as to form a desired sign image against the background of the opaque belt.

17. An illuminated sign comprising: an opaque, continuous loop, traveling belt; means within said belt loop for supporting the same and effecting travel thereof along its longitudinal axis, said belt having a plurality of window openings therethrough arranged generally in rows extending both along the longitudinal axis of the belt and transversely thereto; illuminating means within said belt loop for lighting said window openings; flat, planar, plate-like shutters disposed in said window openings so as to be co-planar with the plane of said belt and being freely rotatable within said openings about central axes at right angles to said plane; covers for said openings retaining said shutters therein for free rotation; at least the cover of the interior face of the belt having opaque-transparent portions arranged in a pattern complementary to said shutters so that in one extreme position of the shutters they close off the transparent portions of the cover and in their other extreme position open said transparent portions for the illuminating means to show therethrough; a single row of encoding electromagnets extending across the belt and positioned in alignment with the rows of openings extending longitudinally of the belt, said shutters being formed as permanent magnets with their opposite poles adjacent opposite edges thereof, being responsive to the energization of an encoding electromagnet positioned adjacent thereto to rotate the associated shutter as an armature to its extreme position opening the transparent portion of its window; means for selectively energizing said electromagnets; means to rotate selected shutters to establish an illuminated image on the belt; and means for synchronizing the energization of said electromagnets with the indexing of a transverse row of window openings therewith.

18. An illuminated sign comprising: an opaque, continuous loop, traveling belt; means within said belt loop for supporting the same and effecting travel thereof along its longitudinal axis, said belt having a plurality of window openings therethrough arranged generally in rows extending both along the longitudinal axis of the belt and transversely thereto; illuminating means within said belt loop for lighting said window openings; flat, planar, plate-like, shutters disposed in said window openings so as to be co-planar with the plate of said belt and being freely rotatable within said openings about central axes at right angles to said plane; covers for said openings retaining said shutters therein for free rotation; at least the cover of the interior face of the belt having opaque-transparent portions arranged in a pattern complementary to said shutters so that in one extreme position of the shutters they close off the transparent portions of the cover and in their other extreme position open said transparent portions for the illuminating means to show therethrough; a single row of encoding electromagnets extending across said belt and conforming in number with the number of openings across the belt and positioned in alignment with the rows of openings extending longitudinally of the belt, said shutters being formed as permanent magnets with their opposite poles adjacent opposite edges thereof being responsive to the energization of an encoding electromagnet positioned adjacent thereto to rotate the associated shutter as an armature to an extreme position opening the transparent portion of its window; means for selectively energizing said electromagnets when indexed with the window openings so as to form a desired sign image against the background of the opaque belt; and a single row of erasing magnets extending across said belt adjacent to said encoding electromagnets and on the upstream side thereof relative to said moving belt, said erasing magnets being positioned to move all of open shutters to their closed position as they pass thereby.

19. An illuminated sign comprising: an opaque, continuous loop, traveling belt; means within said belt loop for supporting the same and effecting travel thereof along its longitudinal axis, said belt having a plurality of window openings therethrough arranged generally in rows extending both along the longitudinal axis of the belt and traversely thereto; illuminating means within said belt loop for lighting said window openings; flat, planar, plate-like shutters disposed in said window openings so as to be co-planar with the plane of said belt and being freely rotatable within said openings about central axes at right angles to said plane; covers for said openings retaining said shutters therein for free rotation; at least the cover of the interior face of the belt having opaque-transparent portions arranged in a pattern complementary to said shutters so that in one extreme position of the shutters they close off the transparent portions of the cover and in their other extreme position open said transparent portions for the illuminating means to show therethrough; a single row of encoding electromagnets extending across said belt and conforming in number with the number of openings across the belt and positioned in alignment with the rows of openings extending longitudinally of the belt, said shutters being formed as permanent magnets with their opposite poles adjacent opposite edges thereof being responsive to the energization of an encoding electromagnet positioned adjacent thereto to rotate the associated shutter as an armature to its extreme position opening the transparent portion of its window; means for selectively energizing said electromagnets when indexed with the window openings so as to form a desired sign image against the background of the opaque belt; and a single row of erasing magnets extending across said belt adjacent to said encoding electromagnets and on the upstream side thereof relative to said moving belt, said erasing magnets being equal in number to the encoding electromagnets and being likewise positioned in alignment with the longitudinal rows of window openings, said erasing magnets being polarized with respect to said shutters to effect movement of all open shutters to closed position as they pass thereby, whereby to continuously erase from the belt a sign image which has passed around the belt loop.

20. An illuminated sign comprising: an opaque, continuous loop, traveling belt; means within said belt loop for supporting the same and effecting travel thereof along its longitudinal axis, said belt having a plurality of window openings therethrough arranged generally in rows extending both along the longitudinal axis of the belt and transversely thereto; illuminating means within said belt loop for lighting said window openings; flat, planar, plate-like shutters disposed in said window openings so as to be co-planar with the plane of said belt and being freely rotatable within said openings about central axes at right angles to said plane; covers for said openings retaining said shutters therein for free rotation; at least the cover of the interior face of the belt having opaque-transparent portions arranged in a pattern complementary to said shutters so that in one extreme position of the shutters they close off the transparent portions of the cover and in their other extreme position open said transparent portions for the illuminating means to show therethrough; a single row of encoding electromagnets extending across said belt and conforming in number with the number of openings across the belt and positioned in alignment with the rows of openings extending longitudinally of the belt, said shutters being formed as permanent magnets with their opposite poles adjacent opposite edges thereof being responsive to the energization of an encoding electromagnet positioned adjacent thereto to rotate the associated shutter as an armature to its extreme position opening the transparent portion of its window; means for selectively energizing the said electromagnets when indexed with the window openings so as to form a desired sign image against the background of the opaque belt; a single row of erasing magnets extending across said belt adjacent to said encoding electromagnets and on the upstream side thereof relative to said moving belt, said erasing magnets being equal in number to the encoding electromagnets and being likewise positioned in alignment with the longitudinal rows of window openings, said erasing magnets being polarized with respect to said shutters to effect movement of all open shutters to closed position as they pass thereby, whereby to continuously erase from the belt a sign image which has passed around the belt loop; means controlling the point in belt travel at which the selective energization of said electromagnets is effected; means on said traveling belt cooperating with said last-mentioned means for synchronizing the energization of the electromagnets with the positioning of a transverse row of shutters thereat; and means for effecting the desired selective energization of said electromagnets at said synchronizing point and for deenergizing all of the electromagnets as said transverse row of shutters moves beyond the synchronizing point in preparation for the selective energization of the electromagnets as the next transverse row of shutters moves into position thereat.

References Cited

UNITED STATES PATENTS

| | | | |
|---|---|---|---|
| 1,371,470 | 3/1921 | Chubb | 40—28 |
| 1,577,609 | 3/1926 | Chubb | 40—28 |
| 1,765,215 | 6/1930 | Duchard | 40—52 |
| 3,004,357 | 10/1961 | Toiza et al. | 40—52 X |
| 3,267,595 | 8/1966 | Levy et al. | 40—52 X |

EUGENE R. CAPOZIO, *Primary Examiner.*

W. GRIEB, *Assistant Examiner.*